2,924,605
IMIDAZOLIDONE DERIVATIVES

William B. Hughes, Webster Groves, Mo., assignor to Cities Service Research and Development Company, New York, N.Y., a corporation of New Jersey No Drawing. Application December 31, 1957
Serial No. 706,276

5 Claims. (Cl. 260—309.7)

This invention relates to inhibiting corrosion of metals, and more particularly relates to an improved composition and process for the prevention of corrosion in natural gas production, collection and distribution systems.

In the production of natural gas, and especially when the producing wells are high pressure wells of the type generally known as gas-condensate wells, some water, along with condensible hydrocarbon fluids, tends to condense out of the gas and coat the walls of the gathering and distribution lines. When carbon dioxide or traces of organic acids are present in the gas, as is generally the case, they tend to dissolve in the condensed water to form highly corrosive solutions which rapidly eat their way through the lines.

I have now discovered that corrosion of the type described may be substantially inhibited by introducing into the production, collection and distribution lines, as well as associated equipment, including tanks, and tank cars a small but sufficient quantity of a reaction product obtained by first reacting dicyandiamide with a polyamine in substantially equimolar quantities to provide an intermediate imidazolidone-guanylimine product which is thereafter reacted with an equimolar amount of urea or thiourea to produce an imidazolidone-guanylimine imidazolidone compound or an imidazolidone-guanylimine imidazolithione compound. When the thiourea is used the products I have found to be unexpectedly effective as corrosion inhibitors.

In preparing these new compounds the imidazolidone-guanylimine is first prepared by reacting one mole of polyamine with one mol of dicyandiamide under conditions which effect the removal of one mol of ammonia from the reaction mixture, and the product resulting is aminoethyl imidazolidone guanylimine which on reaction with urea or thiourea in an equimolar amount produces the respective imidazolidone-guanylimine imidazolidone or imidazolidone-guanylimine imidazolithione product upon liberation of 2 mols of ammonia from the reaction zone.

The new compounds of this invention may be characterized by the following formula:

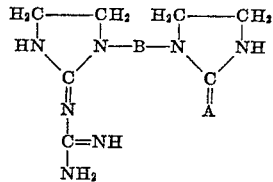

wherein B is selected from the group consisting of —CH₂CH₂— and CH₂CH₂NHCH₂CH₂ and A is selected from the group consisting of S and O.

In preparing the intermediate imidazolidone-guanylimine product the dicyandiamide and the polyamine are heated together at a temperature of from about 140° C. to 150° C. The reaction mixture is maintained at this temperature for a period of about four hours. In preparing this intermediate product, any polyamine can be used; however, due to the decreasing solubility of the final products with increasing molecular weight polyamines such as triethylenetetramine and tetraethylenepentamine are preferred.

In order to more fully understand the nature of the compounds of my invention, the manner in which they are prepared, and the method by which they may be utilized in protecting metallic surfaces from corrosive action, the following specific examples are provided:

EXAMPLE 1

To 84 grams (1 mol) of dicyandiamide, 146 grams (1 mol) of triethylene tetramine is added. To this mixture, one mol of 5% hydrochloric acid is added with caution. The mixture is then heated with stirring to evaporate the water, and heating thereafter continued at a temperature of between 140° C. and 150° C. for a period of about four hours. The resulting product is then neutralized with sulfuric acid with the resulting crystallized precipitate being recrystallized from cold water and dried. The dried material is decomposed by treating with 10% sodium bicarbonate solution. Water present is then evaporated at atmospheric pressure until excessive foaming occurs, at which time benzene is added to the solution and the remaining water by azeotropic distillation. The resulting product, after benzene removal, is of syrupy consistency and has a molecular weight of 170.

To 0.1 mol of this intermediate imidazolidone guanylimine product, 6 grams (0.1 mol) of urea is added and heat applied to the mixture. Heating is carried out at a temperature of about 160° C. until no further evolution of ammonia is noted. The final product resulting is a black viscous liquid which is soluble in alcohol, dispersible in oil.

This product is identified as inhibitor number 1 in the table which follows.

EXAMPLE 2

Following the procedure set forth in Example 1 above, 0.1 mol of the intermediate product imidazolidone guanylimine prepared therein is reacted with 7.8 grams of thiourea by heating the same at a temperature of about 150° C. until no further evolution of ammonia is noted.

The product is identified as inhibitor number 3 in the table.

EXAMPLE 3

To 84 grams (1 mol) of dicyandiamide, 189 grams (1 mol of tetraethylenepentamine is added. To this mixture, 1 mol of 5% hydrochloride is cautiously added. The mixture is heated to evaporate water and further heated for a period of about four hours at a temperature of from 140 to 150° C. until no further ammonia evolution is noted. The product is then neutralized with sulfuric acid and the resulting white crystals recrystallized and dried. This product is then treated with a 10% sodium bicarbonate solution, with water being removed thereafter at atmospheric pressure until substantial foaming occurs. Benzene is then added to form a water benzene azeotrope so that remaining water may be removed from the reaction zone.

To 0.1 mol of the intermediate imidazolidone guanylimine product, 6 grams of urea is added. The mixture is heated to a temperature of about 150° C. for a period of about three hours until ammonia ceases to be evolved.

The final product resulting is identified as inhibitor number 2 in the table

EXAMPLE 4

To 0.1 mol of the intermediate product produced according to Example 3 above, 7.8 grams (0.1 mol) of thiourea is added with the reaction carried out as described above. The product resulting after completion of ammonia removal was tested as a corrosion inhibitor as set forth in the table for the inhibitor identified as number 4.

The effectiveness of these new compounds in reducing corrosion in gas and oil well production, collection, distribution and storage equipment, as well as other metal surfaces exposed to corrosive fluids, may be more fully understood by reference to certain corrosion tests which I have conducted using an acidic brine solution to substantially duplicate well or pipe line conditions. The specific test procedure utilized herein is designed to simulate conditions existing in a gas condensate well. The test technique makes use of an apparatus which deposits a test panel alternately through two phases at the rate of three times per minute. The corrosive mixture or medium is held in a one-liter, three-necked, round bottom flask equipped with a heater, a mercury sealed stirrer, a reflux condenser, and an inlet for passing gas into the bottom of the corrosive liquid. In the test, the stirrer is replaced by a glass hook arranged to carry the test piece. The dipping apparatus is powered by a small electric motor through a cam connection.

The corrosive medium employed was a 5% sodium chloride solution to which has been added 0.2 ml. of a mixture of 50 weight percent formic acid and 50 weight percent acetic acid. To this acid mixture, a varying amount of kerosene is added (10 to 400 ml.) and carbon dioxide or natural gas allowed to pass through the mixture during the test. The variation of kerosene volume permits the test to more nearly simulate conditions existing either in a condensate well or a gas pipe line.

In running the test the, corrosive medium is heated to boiling and the gas introduced. A punched, cleaned, weighed test panel, made of 18 gauge, cold rolled steel, measuring ⅞"×1", was suspended on the glass hook and the dipping process started. The test is normally run for 90 minutes. At the end of this time, the test panel is removed, cleaned, dried, and weighed to give a blank loss. The inhibitor is then introduced to the corrosive medium, the test panel replaced, and the test again continued for an additional 90 minutes. At the end of this time, the panel is again cleaned and weighed to give an inhibited test loss.

The changes in weight of the test strips during the test were taken as a measurement of the effectiveness of the inhibitor composition. By this means, a percentage protection may be calculated for each inhibitor in accordance with the following formula:

$$\frac{L1 - L2}{L1} \times 100 = \text{percent protection}$$

in which L1 is the loss in weight of the strips taken from the uninhibited test, and L2 is the loss in weight of the strips taken from the inhibited test.

The table which follows shows the average percent protection obtained from tests conducted on the new compounds of my invention in the amounts recorded.

*Table*

| Inhibitor Number | Percent Protection | | |
|---|---|---|---|
| | 25 p.p.m. | 50 p.p.m. | 100 p.p.m. |
| 1 | 71.3 | 89.1 | 94.6 |
| 2 | 88.8 | 91.0 | 98.6 |
| 3 | 69.9 | 97.5 | 97.9 |
| 4 | 96.4 | 98.8 | 99.0 |

It will be evident from the foregoing table that the new compounds of my invention provide a substantial amount of protection against the corrosive fluids normally passing through well tubes and associated gathering equipment.

While the tests were conducted with amounts of inhibitor varying from 25 to 100 p.p.m., more or less inhibitor may be used in field operations, depending on the corrosivity of the fluid present. In field use, the concentration of the inhibitor will vary in accordance with the particular conditions found. As has been experienced over periods of time, the corrosivity of a particular well may vary widely, thus necessitating changes in the amount of inhibitor added. The inhibitors of the present invention will normally be used in amounts of from 10 to 1500 p.p.m., and generally not more than about 1000 p.p.m. Their use, of course, at the present time is somewhat limited by their cost. It would be desirable to use substantial quantities of inhibitor in view of the high losses due to corrosion, but the comparatively high cost of compounds of this type limits the amount which can be economically added for protection purposes.

In utilizing these new compounds, it has been found that excellent results are obtained by dissolving them in an appropriate amount of water or other inert solvent such as kerosene or the like. The use of such a solvent permits easy handling and is a convenient means for injecting inhibitor into the well or transfer lines. When utilized in pipe lines, the gas or oil flowing through the lines is effective to mix the inhibitor with the corrosive fluid present, sweeping the same through the system and thereby providing protection for the metal equipment with which it comes in contact after the point of injection.

It is to be understood that the improved compositions of my invention are not limited to use alone, and may be applied along with other agents commonly introduced into wells and pipe lines for breaking emulsions, preventing scale formations, minimizing pitting, etc. It is further evident that my invention is not restricted to the use of my improved compositions for inhibiting corrosion in oil and gas wells and associated equipment, but may be employed to perform this function in the presence of corrosive fluids derived from many other sources.

Having now described my invention, what I claim as new and useful is:

1. A compound having the formula

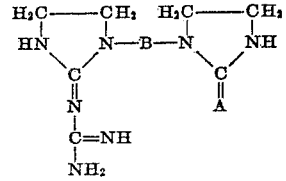

wherein B is selected from the group consisting of —CH₂CH₂— and —CH₂CH₂NHCH₂CH₂— and A is selected from the group consisting of S and O.

2. A compound having the formula

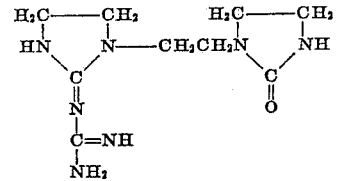

3. A compound having the formula

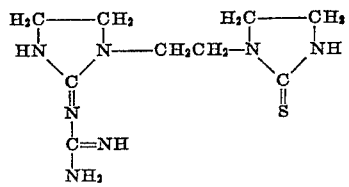

4. A compound having the formula

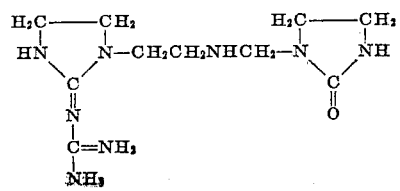

5. A compound having the formula
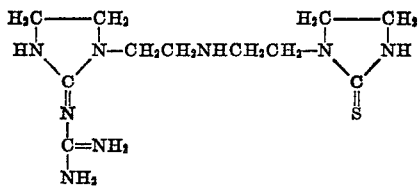
References Cited in the file of this patent
UNITED STATES PATENTS
| | | | |
|---|---|---|---|
| 2,483,969 | Gajewski | | Oct. 4, 1949 |
| 2,622,075 | Hemmi et al. | | Dec. 16, 1952 |
FOREIGN PATENTS
| | | | |
|---|---|---|---|
| 253,709 | Switzerland | | Nov. 16, 1948 |

UNITED STATES PATENT OFFICE
CERTIFICATE OF CORRECTION

Patent No. 2,924,605            February 9, 1960

William B. Hughes

It is hereby certified that error appears in the printed specification of the above numbered patent requiring correction and that the said Letters Patent should read as corrected below.

Column 4, line 69, for that portion of the formula reading "$-CH_2CH_2NHCH_2-$" read -- $-CH_2CH_2NHCH_2CH_2-$ --.

Signed and sealed this 13th day of September 1960.

(SEAL)
Attest:

KARL H. AXLINE
Attesting Officer

ROBERT C. WATSON
Commissioner of Patents